United States Patent [19]

Howland

[11] 4,274,737

[45] Jun. 23, 1981

[54] TEST PATTERNS FOR LENS EVALUATION

[75] Inventor: Bradford Howland, Cambridge, Mass.

[73] Assignee: Massachusetts Institute of Technology, Cambridge, Mass.

[21] Appl. No.: 86,574

[22] Filed: Oct. 19, 1979

[51] Int. Cl.³ .......................................... G01M 11/02
[52] U.S. Cl. ................................................. 356/124.5
[58] Field of Search ............................. 356/124, 124.5

[56] References Cited

U.S. PATENT DOCUMENTS

| 4,060,328 | 11/1977 | Flynt | 356/124 |
| 4,125,328 | 11/1978 | Suga | 356/124 |

OTHER PUBLICATIONS

"Resolving Power of Lenses"; *Photo Technique*, Apr. 1941, pp. 51-52.

"Accepted Standards for 16-mm Projection"; *International Projectionist*, Jul. 1952, pp. 23-24.

*Primary Examiner*—R. A. Rosenberger
*Attorney, Agent, or Firm*—Arthur A. Smith, Jr.; Martin M. Santa

[57] ABSTRACT

Lens testing charts using a vernier pattern, a sawtooth pattern, and a sinusoidally varying reflectance pattern are described and are used in conjunction with a lens under test to be focussed by said lens onto suitable high contrast film to provide an image from which the quality of the lens may be determined.

5 Claims, 9 Drawing Figures

TEST PATTERNS FOR LENS EVALUATION

The Government has rights in this invention pursuant to Grant No. 5 T01 EY00090 from the National Institutes of Health.

BACKGROUND OF THE INVENTION

This invention relates to test patterns for use in testing the quality of a lens and more in particular to a vernier resolution chart and a triangular-wave pattern for testing of a camera lens.

The method preferred in the prior art for testing camera lenses is the direct measurement of the modulation transfer function (mtf) using specialized electronic instruments as in "Electro-Optical Methods of Image Evaluation", Baker, L. R., and T. Moss, Electro-Optical Systems Design Conference, New York City, 1969. Photographic methods for making similar measurements are less accurate, and usually require the use of a microdensitometer. An attempt to circumvent this limitation is that described in "The Sharpness Indicator", I. Putora, J. of the SMPTE, 78: pp. 956–960, November 1969 who photographs circular test patterns of varying fineness with high contrast film; the lens resolution is determined directly by inspection of the negative. Described herein are different improved test patterns which provide direct indication of lens performance when photographed with high contrast film.

SUMMARY OF THE INVENTION

New types of charts are described for testing the quality of a lens. One form of chart is a vernier chart which tests the quality of lens by measuring its edge response function which is reflected in the vernier chart by an apparent shift in the imaged position of a line. A second test pattern is a sawtooth of varying spacial frequency. The degradation in the frequency response of the lens is exhibited by a an apparent decrease in amplitude of the higher spacial frequencies. A third form of chart is one where the intensity in one direction along the length of the chart varies periodically and sinusoidally at increasing spacial frequency along the chart. In the other direction, the reflectance varies linearly between the value at the top of the chart and the value at the corresponding position at the bottom of the chart.

IN THE FIGURES

Other advantages, features, and objects of the invention will appear from the following description taken together with the drawings in which.

DETAILED DESCRIPTION OF THE INVENTION

Figure 1:
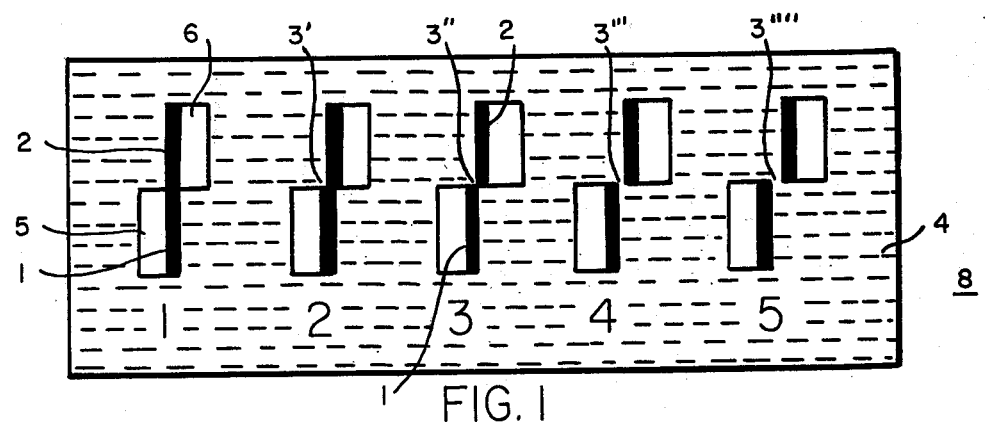
FIG. 1 is the vernier chart embodiment of this invention.

FIG. 1 shows the vernier resolution chart of this invention. The vernier chart of FIG. 1 utilizes pairs of black lines 1, 2 displaced by successive increments 3, on a 20% grey background 4. White lines or borders 5, 6 are placed on opposite sides of the black lines 1, 2, respectively, as indicated. The operation of the chart depends on the small differential motions of the images of the black lines 1 and 2 due to the spreading of the white border into the black, and the black line into the grey background, when an unsharp image is produced by the lens being tested. The degree of unsharpness of the image is indicated by the altered vernier correspondence of the displaced line images.

Figure 2:
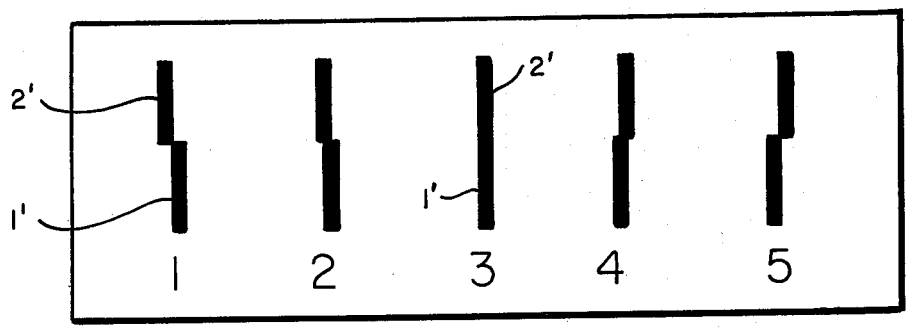
FIG. 2 is the imperfectly focussed image of the chart of FIG. 1.

This behavior of the vernier chart is illustrated in FIG. 2, which represents a photograph of the chart of FIG. 1 with a prescribed amount of defocus in the camera. Note that the vernier correspondence, which occurs at line pairs numbered 1 in FIG. 1, occurs at line pairs numbered 3 in the defocussed image of FIG. 2 because of the shift in relative position of lines 1', 2'. The defocussed image is used as a simulation of the lens defects of astigmatism, or curvature of field. Tests indicate that defocus, lens aberrations, and diffraction blur all affect the vernier sharpness index in FIG. 2. The greater the shift of lines 1',2', the poorer the quality of the lens.

Figure 3:
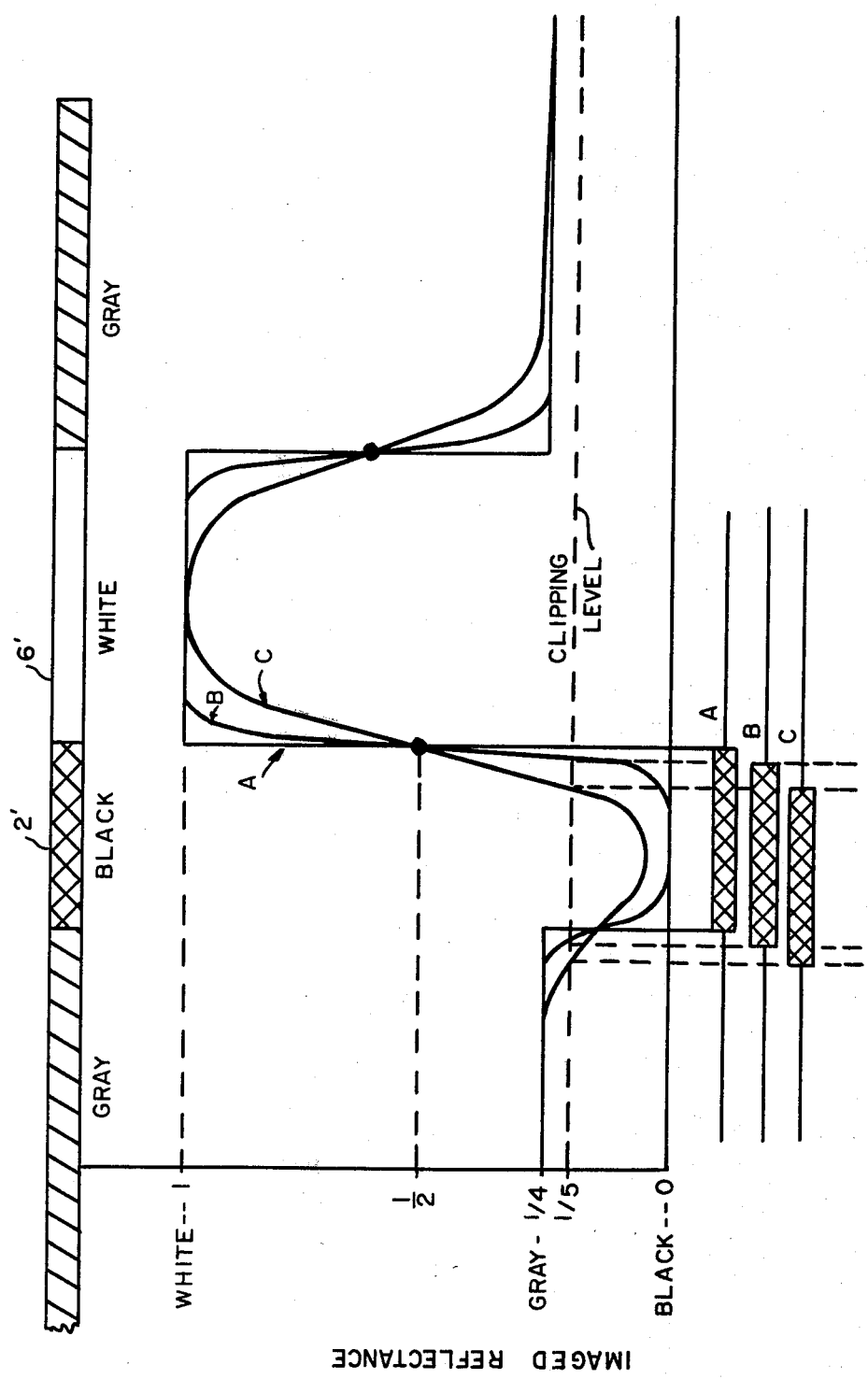
FIG. 3 shows the reflectance distribution across a section on both sides of a black line of FIG. 2.

A qualitative explanation for the action of the vernier chart is facilitated by consideration of the diagram of FIG. 3. Here the reflectance cross section of the image of a black line 2' and white area or line 6' as on the chart of FIG. 2 are shown. The curves A, B, and C represent the response for perfect, slightly unsharp, and more unsharp image focussing, respectively. Also shown in the assumed 20% clipping level of high contrast film in the camera which determines where the print image will be white or black. The response of either curve B or C is represented in FIG. 2. From FIG. 3 it is seen that the result of the finite slope of the line spread function of the defocussed images is to move the image of the black lines 1, 2 away from the white areas, 5, 6, respectively, as shown in FIG. 1. This increment of movement is somewhat dependent on the choice of clipping level.

Examination of FIG. 3 discloses that the width of the black line is substantially preserved by having the side of the black line opposite that of the white line be a grey tone of approximately 25% reflectance and where the high contrast film has a transition from white to black at the 20% reflectance level. Preservation of the line width of the black lines makes the result comparison of the shifted lines 1', 2' more easy and accurate than otherwise.

It is preferred that the width of the black line 1 of FIG. 1 is sufficiently wide so that when it is bordered on one side by the white area 5 and the other side by grey area 4 there results a reproduced black line 1' as in FIG. 2 which is readily observable. For the chart of FIG. 1 a typical width of the black lines 1, 2 is 12 mils, the width of the white region 5 and 6 being about 60 mils and the incremental shift in position as for example between the pairs numbered 1 and those numbered 2 of the black lines 1 and 2 of FIG. 1 being about 2 mils per position. The widths of black lines 1 and 2 and white regions 5 and 6 together with the incremental shift in position of black lines 1 and 2 for each position on the chart are not critical dimensions. However these dimensions, especially the incremental displacement of the black lines, will affect the position of alignments as in FIG. 2 and therefore calibration of a chart is necessary for it to provide line resolution of MTF data. This calibration information could be provided on the chart instead of the numeral representations of positions 1–5.

It should be recognized that FIG. 1 may have more line-pairs than the five line-pairs shown.

Extensive tests with a variety of early and contemporary 35-mm camera lenses at different aperture settings have demonstrated that the vernier chart (edge sharpness gauge) is a useful and sensitive test for the assessment of lens quality. The particular advantages of this method are: (a) the test result is largely unaffected by the parameters of the photographic process, (b) the test result is independent of the sharpness of the enlarging lens used to make the print, (c) the test result is directly interpretable in terms of the steepness of the edge response function of the lens, which is of course, the Fourier Transform of the mtf response, (d) since the method does not require a microdensitometer, it can be used by amateur and professional photographers of limited budget or little scientific training. The ability of the unaided eye to perceive very small displacements of alignments is utilized in the chart of FIG. 1; this ability is termed Vernier Acuity.

A further application of the vernier chart is to measure the performance of microscope lenses. The advantage here is that the vernier chart does not require line elements too fine to reproduce by microphotography, as in the case with conventional resolution charts.

Figure 4:
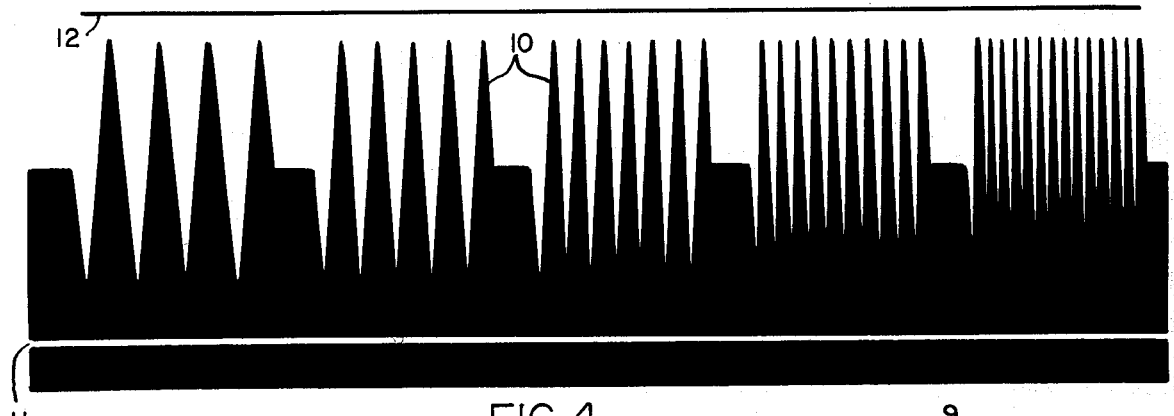
FIG. 4 shows a sawtooth chart embodiment of this invention.
Figure 5:
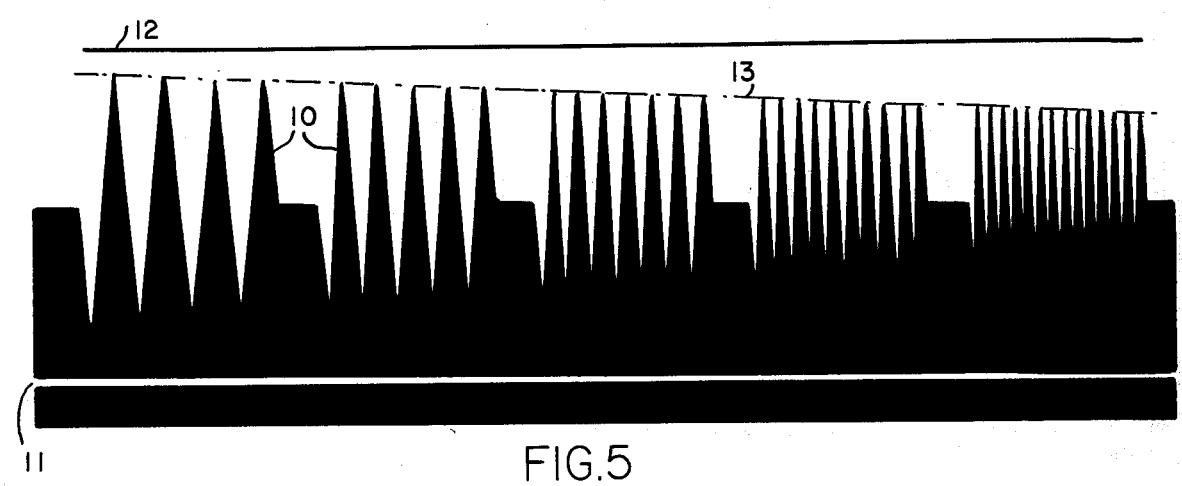
FIG. 5 shows the imperfectly focussed image of the chart of FIG. 4.

A second test method is the use of the triangular wave pattern shown in FIG. 4. For this purpose, a set of triangular patterns 10 of geometrically increasing spacial frequency were generated on an oscilloscope and combined as a photo-montage. In FIG. 5 the result is shown of photographing this montage with an inferior lens, with high contrast film and using an exposure index chosen to render the pattern symmetrical with respect to the white reference line 11 and the black reference line 12. In other words; the clipping level of the high-contrast film corresponds to a reflectance value of 0.5. The amplitude of the envelope 13 of the patterned triangular areas renders an approximate plot of the mtf response of the lens; if the response is highly degraded, this approximation becomes quite exact. Analysis shows that, for only slightly degraded responses, the fall off in the height of the triangular-wave pattern is proportional to the linear extent of the edge response function, evaluated at the 25% and 75% points.

Figure 6:
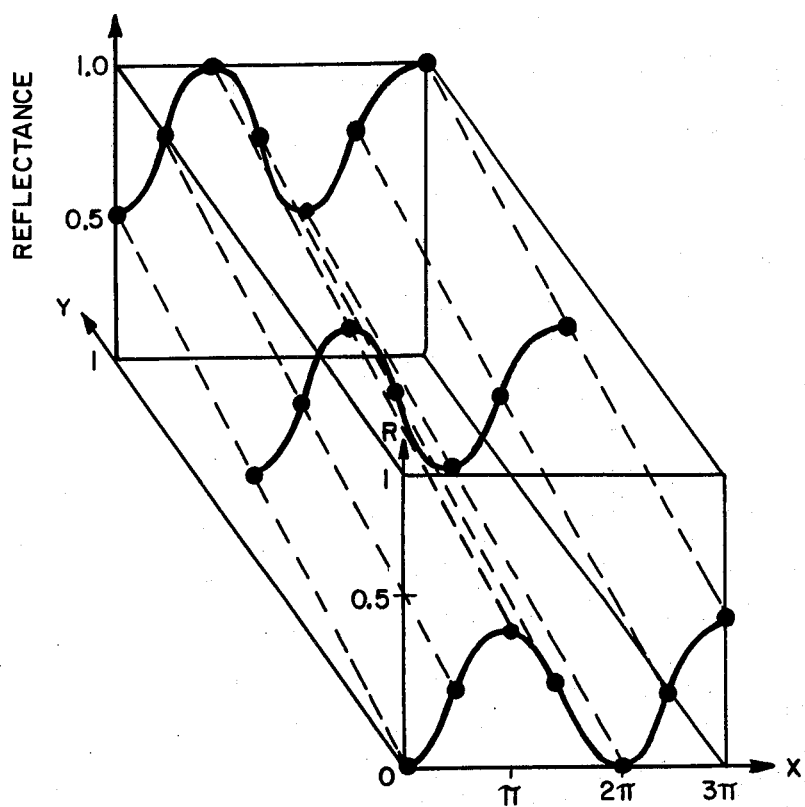
FIG. 6 shows a section of the chart FIG. 7 illustrating the reflectance change along the chart.

These results suggest the existence of a pattern which, when photographed with very high contrast ratio, would indicate the exact mtf response of the lens. The realization of such a pattern requires continuous tone reflectance variation according to the equation:

$$R = (\tfrac{1}{4}) \sin \omega x + (\tfrac{1}{2}) y + (\tfrac{1}{4})$$

Where x and y are coordinates in the plane of the paper as shown in FIG. 6, 7. In FIG. 6 the scale of the x-coordinate has been enlarged for clarity. The reflectance is to exhibit a sinusoidal variation with x, together with a linear shading with y. The operation of this chart is explained by analogy with the sphygmomanometer, used to measure blood pressure. The reflectance along the x direction of the chart of FIG. 6 varies sinusoidally with monotonically increasing frequency; at the top of the chart reflectance varies from 1 to 0.5 to 1. At the mid-height of the chart, reflectance has a periodic sinusoidal variation of increasing frequency from 0.75 to 0.25 to 0.75. At the bottom of the chart, reflectance varies sinusoidally from 0.5 to 0 to 0.5. The reflectance varies lineraly in the y direction.

Figure 7:
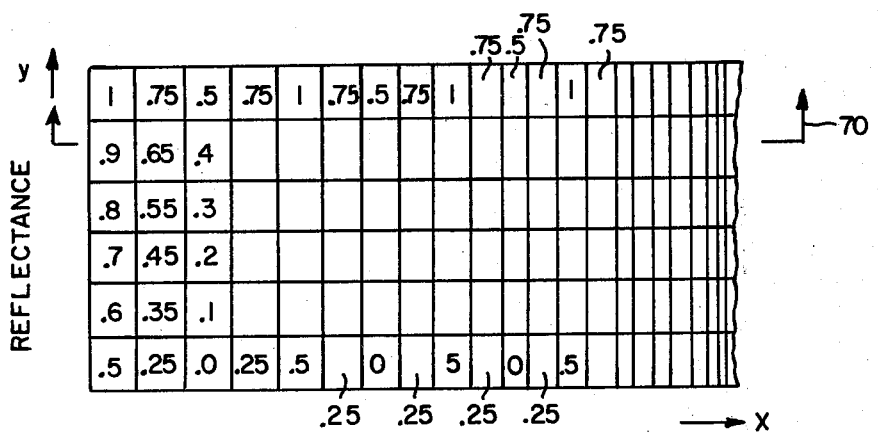
FIG. 7 is a chart illustrating the reflectance distribution shown in FIG. 6.
Figure 8:
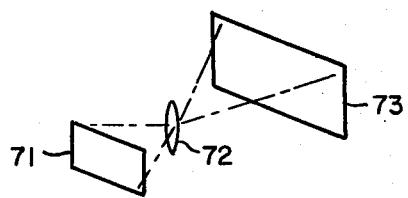
FIG. 8 shows a lens testing system.

Because of difficulty in drawing a chart having continuous gradations in reflectance, the chart of FIG. 7 is a discrete approximation having regions with fixed reflectance and with the degree of reflectance shown within each region. As the frequency of the sinusoidal variation in intensity increases, the width of the regions of FIG. 7 decrease in the x direction to indicate increased frequency. Thus if the film clips at 0.5 reflectance, and if the chart is imaged perfectly, substantially any cross-section 70 of the high contrast image chart of FIG. 7 will contain both black and white areas. Now however, if the sinusoidal component of reflectance is reduced by imperfect imagery by a factor $\alpha < 1$, then the region of the high-contrast image of the chart defined by the equation $y < \alpha/2$ will be solid white, and the region $1 - \alpha/2$ will be black. The extent of the intermediate shaded region will, therefore, be reduced by the same factor $\alpha$. A composite chart as approximated in FIG. 7, with progressively increasing spacial frequencies will, when so photographed, render an exact plot of the mtf response of the lens. The spacial sinusoidal frequency of the chart, instead of being continuously increasing, can be increased by discrete increments as shown in FIG. 7. FIG. 8 illustrates a lens test assembly where the chart 73 is focussed on film 71 by the lens 72 which is being tested. The chart 73 may be any of those illustrated in FIG. 1, 4 or 7 and the contrast of the film 71 should be compatible with the test chart and the exposure index being used is in conformance with the clipping levels of the film as taught in the foregoing specification.

Figure 9:
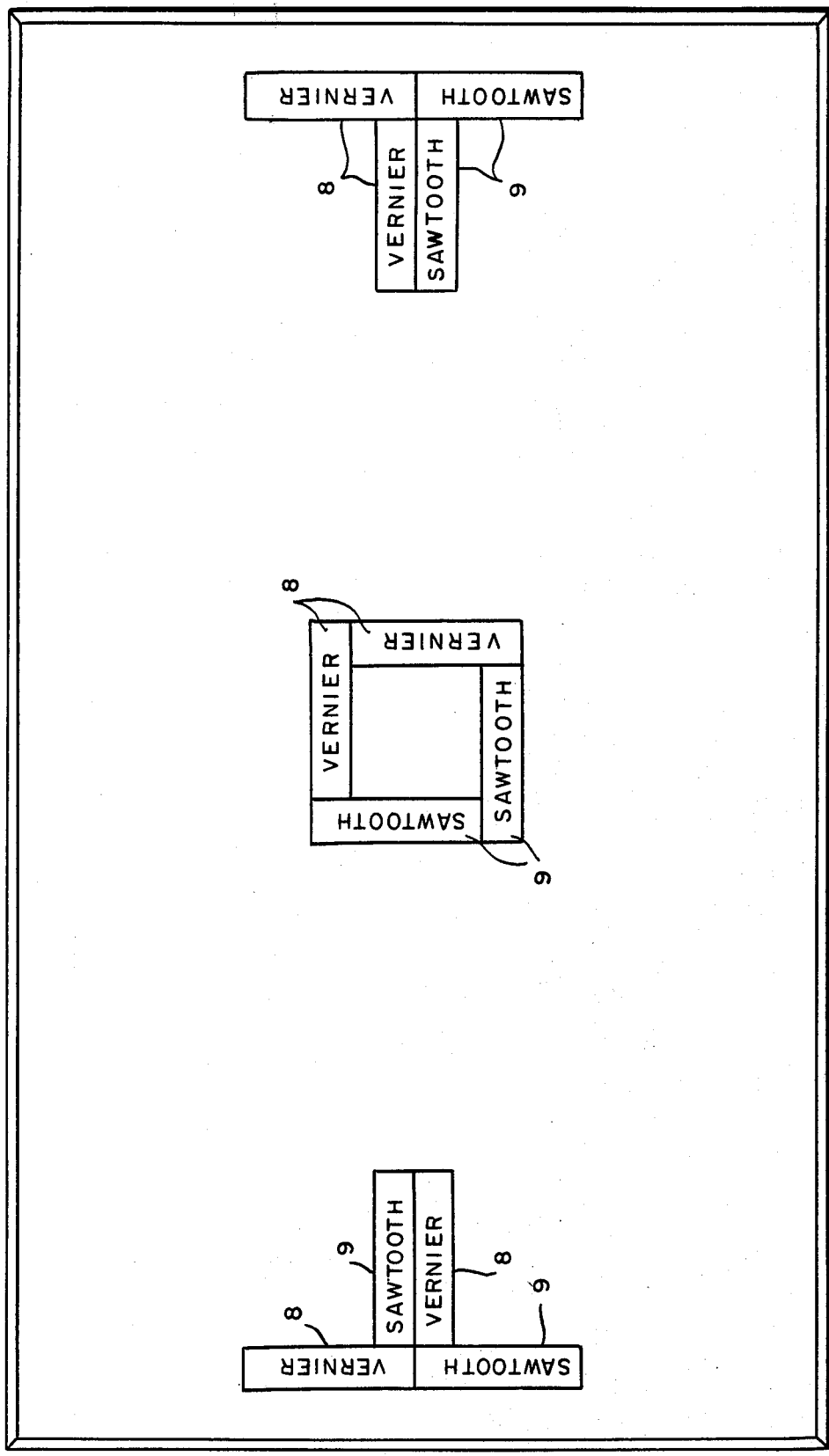
FIG. 9 shows a test chart using the charts of FIGS. 1, 4, or 7.

FIG. 9 shows an arrangement of the vernier charts 8 and triangular charts 9 which have been placed on a wide area chart 73, typically 20×30 inches, where each of the charts 8, 9 is substantially 3 inches long. For this chart, the triangular wave patterns have been specially fabricated so as to have a reflectance value of 40% in those areas which were heretofore described as being white (100% reflectivity), black areas being reproduced as black. The arrangements of the charts as shown in FIG. 9 allows the center and the edges of the lens to be checked simultaneously. It should be recognized that the individual charts 8 or 9 may be used instead of the combination shown in FIG. 9. It should also be recognized that the chart of FIG. 7 could be substituted for the either chart 8 or 9.

It is evident that those skilled in the art, once given the benefit of the foregoing disclosure, may make numerous other uses and modifications of, and departures from the specific embodiments described herein without departing from the inventive concepts. Consequently, the invention is to be construed as embracing each and every novel combination of features present in, or possessed by, the apparatus and techniques herein disclosed and limited solely by the scope and spirit of the appended claims.

What is claimed is:

1. A lens testing chart comprising,
   a plurality of pairs of black lines, the black lines of each pair being substantially aligned along their lengths but transversely displaced by a different amount in each pair, each of the black lines of each pair having a white region along one of its sides and a grey region along the other of its sides, the white region for one of the black lines of a pair being on one side of the one black line of the pair and the white region for the other black line of the pair being on the other side of the other black line of the pair.

2. Apparatus for testing a lens comprising, a chart as in claim 1, a film, the lens under test focussing the image of said chart on said film, said film, being a high contrast film which clips at a reflectance level less than the grey level of said chart.

3. Apparatus for testing a lens comprising, a lens testing chart comprising, a sawtooth waveform having a different frequency of sawtooth along its length, the frequency being progressively higher in one direction along the length, the portion above the sawtooth waveform being either white (a reflectance of one) or black (a reflectance of zero) and the portion below the sawtooth waveform being of the opposite color, a high contrast film, the lens under test focussing the image of said chart on said film, said film having a clipping level at a reflectance level of substantially one-half.

4. A lens testing chart comprising, a rectangular chart having a sinusoidal variation of reflectance along its length, the frequency of the sinusoidal variation monotonically increasing in one direction along the length of the chart, the reflectance of the chart along its upper edge varying in a sinusoidal manner from 1.0 to 0.5 to 1.0, the reflectance of the chart along its lower edge varyng in a sinusoidal manner from 0.5 to 0 to 0.5, the sinusoidal variation of reflectance of the top and bottom of said chart being in phase, the reflectance at any section transverse to the length of the chart varying linearly between the upper and lower edge reflectance values.

5. Apparatus for testing a lens comprising, a chart as in claim 4, a film having a clipping level at a reflectance level of substantially 0.5, the lens under test focussing said chart on said film.

* * * * *